United States Patent
Weikert (10) Patent No.: US 11,400,597 B2
(45) Date of Patent: Aug. 2, 2022

(54) METHODS FOR THE CORRECTION OF AXIS MOTIONS

(71) Applicant: Agie Charmilles SA, Losone (CH)

(72) Inventor: Sascha Weikert, Zurich (CH)

(73) Assignee: Agie Charmilles SA, Losone (CH)

( * ) Notice: Subject to any disclaimer, the term of this patent is extended or adjusted under 35 U.S.C. 154(b) by 214 days.

(21) Appl. No.: 16/713,505

(22) Filed: Dec. 13, 2019

(65) Prior Publication Data

US 2020/0189113 A1 Jun. 18, 2020

(30) Foreign Application Priority Data

Dec. 14, 2018 (EP) .................................... 18212589

(51) Int. Cl.
  *B25J 9/16* (2006.01)
(52) U.S. Cl.
  CPC .................................. *B25J 9/1692* (2013.01)
(58) Field of Classification Search
  CPC .... B25J 9/1692; B25J 19/0037; B25J 9/1653; G05B 2219/49177; G05B 19/404; G05B 2219/49012; G05B 2219/50054; G05B 19/401; G05B 19/41825; G05B 19/4063; B23K 26/08; B23K 26/00; B23K 26/36; B23K 26/361; B23K 26/362; B23K 26/364; B23K 9/1272; B23K 9/1274; B23K 9/1278; B23K 15/08; B23K 2101/26; B23K 2101/24; B23Q 15/14; G01B 21/045; G01B 21/042
  See application file for complete search history.

(56) References Cited

U.S. PATENT DOCUMENTS

| 6,769,962 B2 | 8/2004 | Kinbara et al. |
| 2018/0328705 A1 * | 11/2018 | Sprenger .............. G01B 21/045 |

FOREIGN PATENT DOCUMENTS

| EP | 1559990 A2 | 8/2005 |
| JP | H05123921 A | 5/1993 |
| JP | H071229 A | 1/1995 |
| JP | H08187620 A | 7/1996 |
| WO | WO-2014118366 A1 | 8/2014 |

OTHER PUBLICATIONS

Extended European Search Report dated Apr. 18, 2019 for Application No. 18212589.8-1215 (6 pages).

* cited by examiner

*Primary Examiner* — Abby Y Lin
*Assistant Examiner* — Esvinder Singh
(74) *Attorney, Agent, or Firm* — Harness, Dickey & Pierce, P.L.C.

(57) ABSTRACT

A method for the mechanical correction of geometric motion errors of a positioning machine having at least two machine frame components and at least one axis movement assembly for the relative movement of the machine frame components, the at least one axis movement assembly comprising a plurality of axis guide components, each axis guide component and each machine frame component having a mounting surface. A mounting surface correction profile is determined for the considered axis, whereas the mounting surface correction profile describes the correction amounts in function of the position for the mechanical correction of the considered axis. The determined mounting surface correction profile is imparted to the mounting surface of the axis guide component or to the mounting surface of the machine frame component of the considered axis by machining.

13 Claims, 8 Drawing Sheets

METHODS FOR THE CORRECTION OF AXIS MOTIONS

CROSS-REFERENCE TO RELATED APPLICATIONS

This application claims the benefit and priority of European Patent Application No. 18 212 589.8 filed Dec. 14, 2018 and is incorporated by reference herein in its entirety.

DESCRIPTION

The present invention relates to a mechanical correction method to improve the geometric accuracy of axis movements of positioning machines such as machine tools, measuring machines, manipulators, and robots.

BACKGROUND OF THE INVENTION

Machine tools, coordinate measuring machines, etc. are high precision positioning machines, build-up of a structural loop which is constituted by a base and a number of linear and/or rotary axes connecting a work piece and a tool side. The structural loop is defined as an assembly of mechanical components, which maintain a relative position between specified objects. In a machine tool the structural loop includes the machine frame, guideways, bearings, drives, transmission and the tool and work-holding fixtures. The machine frame includes bed, column, table, console, transverse beam, etc.

The main task of these components is to provide a relative motion between work piece side and tool side at the Tool Center Point (TCP) under additional requirements regarding accuracy and velocity while also providing mechanical stiffness, to minimize the deviations on the intended motion.

In machine tools, many parts interact to achieve a final accuracy such as geometric motion errors, thermo-mechanic errors, loads, dynamic forces and motion control. Following document is referenced to this regard: Schwenke H., Knapp W., Haitjema H., Weckenmann A., Schmitt R., Delbressine F., "Geometric error measurement and compensation of machines—An update", Annals of the CIRP 57(2), pp. 660-675.

On the hardware side, geometric motion errors and loads are to be addressed to enhance the static or quasi-static accuracy of a machine.

Geometric motion errors are errors due to imperfect geometry and dimensions of machine components as well as their configuration in the machine's structural loop, axis misalignment and errors in the machine's measuring system. For the description of the geometric errors in ISO 230-1 distinguishes between error motions and location and orientation errors and shows corresponding measuring procedures. For the testing of the resulting displacements at the TCP, ISO 230-2 focusses on the accuracy and repeatability of the positioning of numerically controlled axes. In addition to this ISO 230-11 refers to measurement instruments suitable for machine tool geometry tests. Complementary in ISO 10791-1 and ISO 10791-2 tests are defined while in ISO 10791-4 tolerances are defined for the positioning tests given in ISO 230-2.

Due to the finite stiffness of the machine components, their location and dimension changes due to internal and external forces. In some cases, the weight and position of for instance the work piece or moving carriages of the machine have a significant influence on the machine's accuracy. For instance, if straight guideways bend due to the weight of the moving slide, the slide will show a vertical straightness deviation and a pitch error motion.

Due to the fact that the numerous geometric deviations in the machine components affecting the accuracy at the TCP cannot be reduced by dedicated fabrication with reasonable effort, compensation of systematic errors in machine tools (MT) and coordinate measurement machines (CMM) has a long history.

There are fundamentally different ways to compensate errors in machines; for instance, a straightness error of a carriage guide can be compensated, either by purely hardware techniques, e.g. scraping the guide, or by software techniques, modifying numbers indicating the carriage transversal position.

Software compensation based on measurements is limited by a number of aspects including the uncertainty of the measurement and the repeatability of the mechanical system. The rate of change of errors defines the density of the measurement and the correction points respectively. A point interval of 50 mm leads to 27 thousand values of volumetric 3D-error compensation for a working volume of 1 $m^3$. The ability of the numerical control (NC) to generate the corrected set points on line, during the motion is required. Applying numerical compensation to machines with noticeable hysteresis may also have negative effects. For example, for machining an XY-plane, the Z axis will move continuously in small increments and changing direction to compensate for a vertical straightness deviation of the X- and Y-axis, which may lead to improved flatness. However this motion in combination with a hysteresis of the Z-axis may harm the surface finish quality. Additionally, for the correction of rotational errors corresponding rotary axes would be required, which are not available in the case for three axis machines.

On CMMs only the 3D location of the contact point is of interest and can be determined off-line after the probing, while on MTs 5 or 6 degrees of freedom have typically to be governed throughout the movements in real time.

For these reasons, on MTs mainly pitch correction is applied, correcting the errors of the lead screw or the linear scale, which does not require additional axis movements and so is not prone to hysteretic effects.

Hardware correction techniques consist in the modification of the geometry of guideways mounting surfaces of structural machine components to eliminate or at least reduce the effects of geometric deficiencies. To date the application of at least partially automated hardware correction techniques is limited by the difficulty to manufacture the intended corrective shape with the available methods, e.g. a grinding process. These methods are unable to create a defined corrugated geometry having micrometer amplitude on a surface. Therefore manual scraping as additional iterative machining step is sometimes applied, but manual scraping has deficiencies which lie in the staff cost, the long duration of the process and the default of skilled personnel for this work.

There have been several attempts to overcome these deficiencies. Various automated mechanical systems have been proposed, aiming in replacing the manually realized movement of the scraping tool by automated mechanical means to enhance flatness, to get mating surfaces. Examples are shown for instance in JP5-123921A, JP7-1229A or JP8-187620A, some including image recognition for the identification of the areas to be processed, i.e. high points. In addition to the fabrication of flat mating surfaces, the generation of the special surface structure adapted to promote formation of fluidic films has been addressed. Further, methods to replace the traditional way of manual or automated mechanical scraping by the use of a laser machining process have been proposed. For instance, U.S. Pat. No. 6,769,962B2 discloses a method in which a surface is machined by means of laser machining in a high-precision scraping process to form recesses such as oil grooves or pattern in the surface. Also WO2014118366A1 discloses a method in which the sliding surfaces of a guiding device are micro-structured by laser texturing to enhance the frictional behavior. The micro structuring may comprise formation of micro-cavities, which serve as oil pockets. The sliding surfaces addressed in this disclosure are essentially sliding contact bearing surfaces, i.e. plain guides.

In summary, today there is no viable solution for a mechanical correction of geometric motion errors and mechanical correction of deformation of the structural loop due to gravity during displacement of mechanical components, that is the mechanical correction of systematic deviations encountered in a high precision positioning machine. The at least partial mechanical correction of systematic errors in high precision positioning machines is highly desirable, but known methods have severe technical limitations and lack in their industrial applicability due to the cost and technical reasons.

For the avoidance of doubts, the surface structure such as the formation of oil pockets and surface uniformity such as elimination of high points, i.e. flatness of the surface is only of minor interest, as in the inventive method there is no motion between the considered surfaces and the roughness and short- to medium length waviness is mechanically suppressed by the adjacent component surface being in contact.

SUMMARY OF THE INVENTION

It is an aspect of this invention to overcome the disadvantages of the known methods and to provide an improved, quick, precise, efficient, reliable and economically affordable method for the mechanical correction of high accuracy mechanisms, such as to provide an improved accuracy of axis motion. The correction is established by measuring the geometrical deviations contributing to the axis accuracy such as the mounting surfaces of guideways, in combination with the calculation of the deformations due to gravity, taking into account the position dependency of these deviations. The measured and the calculated deviations are used to determine the mounting surface correction profile. This profile serves as input value to mechanically modify the axis geometry by means of laser machining, to compensate the cumulated deviations.

In substance, the present invention discloses a method for the mechanical correction of geometric motion errors of a positioning machine having at least two machine frame components and at least one axis movement assembly for the relative movement of the machine frame components, the at least one axis movement assembly comprising a plurality of axis guide components, each axis guide component and each machine frame component having a mounting surface, characterized in that a mounting surface correction profile is determined for the considered axis, whereas the mounting surface correction profile describes the correction amounts in function of the position for the mechanical correction of the considered axis, and that said determined mounting surface correction profile is imparted to the mounting surface of the axis guide component or to the mounting surface of the machine frame component of the considered axis by machining.

The amounts of material determined by the mounting surface correction profile can be precisely and selectively removed by a suitable machining process, e.g. laser machining. The mounting surface correction profile specifies the amounts of material to be removed from the mounting surface in function of the position. In this way the mounting surface correction profile is quickly, precisely and permanently imparted to a mounting surface of the axis guide component or to a mounting surface of the machine frame component, such as to achieve an optimal axis motion accuracy of the assembled positioning machine.

Another aspect of the present invention is directed to identification of the above-mentioned mounting surface correction profile, which is derived by combining the deviations derived from part measurements and axis position dependent deviations derived from a mechanical model.

More specifically, the mounting surface correction profile is derived firstly from a measured geometric error of the mounting surface of the individual machine frame component, the geometric error being a straightness error determined in function of the position along the mounting surface of the considered axis, and/or secondly from a computed deviation of the Tool Center Point (TCP) of the positioning machine, determined by the relative displacement, i.e. translation and/or rotation of the machine frame components along the considered axis.

Said mounting surface correction profile may thus include a portion which reflects the straightness error measured at the mounting surface of individual machine frame components, and/or a computed portion which reflects the deviation of a TCP of the assembled positioning machine due relative displacement of the weights along an axis and consequent position dependent deformation due to the limited stiffness of the structural loop, where the deformation is computed using a machine model.

According to an aspect of the present invention, the geometric error of the mounting surface of the individual machine frame component is firstly determined by measurement, and then said measurement is corrected in consideration of the deformation experienced by the individual machine frame component in the measuring configuration. In this way, the measured deviation at the mounting surface of the individual machine frame component is free from deviations that are due to the particular measuring setup.

In particular, the geometric error of the mounting surface of the individual machine frame component is first determined by measurement of the straightness or flatness of the mounting surface of the individual machine frame component, in a measuring configuration, and a static deformation of the individual machine frame component due to gravity at the mounting surface is computed for said measuring configuration, and lastly, an adjusted geometric error of the mounting surface of the individual machine frame component is computed by subtracting the computed deformation occurring in the measuring configuration from the firstly measured geometric error. The static deformation in the measuring configuration is computed using a model of the machine frame component.

According to a further aspect of the present invention, the computed static deformation of the individual machine frame component occurring in the measuring configuration is determined in consideration of the orientation of the machine frame component with respect to gravity and in consideration of the position and stiffness of support points and/or fixation points, preferably by numerical simulation.

According to a further aspect of the present invention, the computed deviation of a TCP of the positioning machine is transposed at the mounting surface of the machine frame component such that the computed deviation of the TCP is cancelled. This transposition is made using a machine model representing the position dependent deformations in combination with mathematical optimization methods linking TCP deviations and geometrical modifications of the mounting surface.

According to a further aspect of the present invention, the mounting surface correction profile is further derived in consideration of a geometric error of an axis guide component of the considered axis, said axis guide component being one or more of, the axis guideway of the considered axis, including rail and/or carriage, and an intermediate component, in particular a shimming foil or a shimming block.

By measuring the geometric deviation, respectively dimension variation (thickness or height variation) of the axis guide components of the axis movement assembly the measured deviation can be used as input values in the computation of the mounting surface correction profile. The relevant dimension variation is for instance a height variation of the ball track of the guideway rail along its extension direction. In this way not only the geometric deviation of machined machine frame components, but also the individual geometric deviations of for instance the guideways are identified and considered in view of the mechanical correction.

According to a further aspect of the present invention the mounting surface correction profile is computed as the sum of:
  the inverted adjusted geometric error along the mounting surface of the machine frame component of the considered axis, and
  the inverted geometric error of one or more axis guide components along the mounting surface of the considered axis, and
  the computed deviation of a TCP of the positioning machine determined by the relative displacement of the machine frame components along the considered axis, transposed at the mounting surface of the machine frame component.

In other words, the measured deviations of the actual geometry of the mounting surfaces of the axis guide components and machine frame component, together with information about the elastic deformation of structural components due to axis motion derived from the machine model are used to generate the mounting surface correction profile which serves as input for the mechanical correction of the support surfaces.

According to a further aspect of the present invention, the mechanical correction of the considered axis is imparted by removing the material amounts according to the determined mounting surface correction profile at either the mounting surface of the machine frame component of the considered axis, or the mounting surface of the rail(s) of the guideway(s) of the considered axis, i.e. the rail bottom or side surface, or the mounting surface of an intermediate component, in particular a shimming foil or a shimming block.

According to an aspect of the present invention, the mechanical correction of the considered axis is imparted to the mounting surface of the axis guide component by one of a mechanical machining, chemical machining, thermal machining or additive manufacturing.

According to an aspect of the present invention, the mechanical correction of the considered axis is imparted to the mounting surface of the axis guide component by laser machining.

According to an aspect of the present invention the axis movement assembly for the relative movement of the machine frame components is a linear axis movement assembly or a rotary axis movement assembly.

According to an aspect of the present invention the positioning machine is a machine tool, a coordinate measuring machine or a manipulator. The invention is applicable to any positioning machine in which a precise axis movement is needed for the relative positioning of two or more parts, such as the relative positioning of a tool with respect to a work-piece, the relative positioning of a probe with respect a part to be measured, the relative positioning of a surgical instrument by a surgical robot, the relative positioning of a gripper or other end effector with respect to a machine to be assembled, etc. The architecture of the positioning machine may be a serial-, a parallel- or a hybrid kinematic.

According to another aspect of the present invention, a positioning machine having at least two machine frame components and at least one axis movement assembly for the relative movement of the machine frame components, the at least one axis movement assembly comprising a plurality of axis guide components, each axis guide component and each machine frame component having a mounting surface, where the positioning machine is characterized in that at least one of the mounting surfaces of the axis guide components and/or machine frame components is corrected according to the method illustrated in one of the preceding claims.

According to an aspect of the present invention, the mounting surface correction profile is imparted by means of a dedicated equipment, which is specially adapted to accommodate an axis guide component having a main extension direction, such as a guideway rail or a shimming foil, and to achieve a precise and efficient correction of a mounting surface thereof. Such a device for the mechanical correction of a mounting surface of an axis guide component of a positioning machine comprises a mounting table for the mounting of the axis guide component, one or more reference elements for the precise positioning of the axis guide component on the mounting table and/or holding means and/or clamping means to fix the axis guide component against the mounting table, a laser unit producing a laser beam who's axis is essentially orthogonal with respect to the mounting table, the mounting table and the laser unit being movable with respect to each other in the direction of the axis guide component axis, and a control unit to control the laser beam of the laser unit and the relative position of the mounting table with respect to the laser unit, such as to impart the mounting surface correction profile to the mounting surface of the axis guide component.

DESCRIPTION OF THE DRAWINGS

The invention and certain embodiments thereof are now further described, by way of examples, and with reference to the accompanying drawings. The figures show the following.

DETAILED DESCRIPTION OF THE PREFERRED EMBODIMENT

For clarity a number of terms used in the present invention are first explained.

According to the present invention the term "mounting surface" is used to define the supporting surfaces of the machine frame component where the axis guideway is mounted, the supporting surfaces of the guideway, in particular the bottom or side surface of the rail, and the surfaces of an intermediate component. The intermediate component is a mechanical component mounted between the rail of the guideway and the mounting surface of the machine frame component. This intermediate component is a shimming foil. The size of the mounting surface corresponds essentially to the bottom surface of the guideway rail. Mounting surfaces are relevant for the straightness of an axis motion.

According to the present invention, the guideways, the intermediate component (shim) and the mounting surface of the machine fame component which is adjacent to a guideway are defined as "axis guide component". Axis guide component are stapled, adjacent to each other, collectively determining the axis motion accuracy.

According to the present invention, the "mounting surface correction profile" defines the amounts of material to be removed at each position along the mounting surface, and serves as input for the mechanical correction of the mounting surfaces. The correction profile indicates the depth of material to be removed along the mounting surface in function of the position.

According to the present invention, the term "mechanical correction" means the correction of one of the mounting surfaces of an axis. The mechanical correction consists in an removal (or addition) of material at the mounting surface, in a direction normal to the axis direction.

According to the present invention, the "machine model" is a model representing the geometry and the deformation properties of the structural machine components. The machine model is used to compute the static deformation of a machine frame component in a measuring configuration. The machine model is also used to compute the deformation of machine frame determined by the displacement of machine frame components of the assembled machine, thus during use.

The shimming is an alignment technique, sometimes used in the assembly of machine tools to improve geometric accuracy, where it is not possible to ensure a desired tolerance of structural components by the available machining equipment alone. Typically, a shimming procedure is adopted to achieve the desired orthogonality of movement of a quill with respect to a base. For example, a base bears a column which bears a quill. A mounting surface of the column for mounting of the carriages of a linear guide should be orthogonal to the table mounted on the base. An orthogonality error is compensated by insertion of a thin foils, i.e. shimming foils between the carriages and their mounting surface on the column. These foils are typically steel bands known as shimming foils or shimming plates, or simply shims.

Figure 9A:
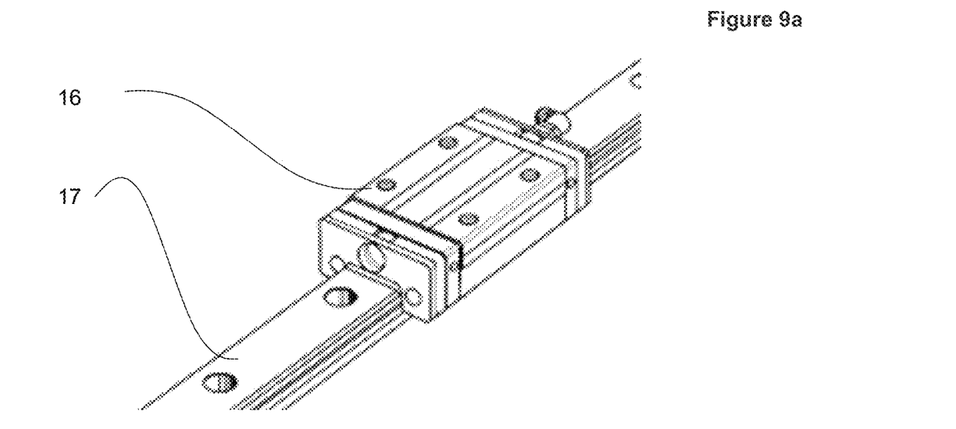
FIG. 9a A view showing the rolling element linear guideway.

The relevant parts of an exemplary positioning machine according to the present invention are now described with reference to FIG. 1. The structural frame 99 of the illustrated positioning machine, which in the specific case is a 3-axis machine tool comprises a base 10 which is supported by 3 or more machine mounts 19, a column 11, a cross-slide 12, a traverse 13 and a quill 15. Between these machine frame components there are pairs of linear guideways 20, 30, 40. These guideways are profile rail guides (also linear motion guides) for high precision linear movements. As shown in FIG. 9a the guideway consist mainly of a profiled rail 17 and a carriage 16 (also blocks) with recirculating rolling elements within the carriage. Between the machine frame components and each rail there are shimming foils 23, 33, 43. Each axis has a motor (not shown), typically a direct driven rotary motor system, a rotary motor system with a ball-screw or a linear motor. Each axis has also position measuring means, typically glass scales (not shown). Further the illustrated machine tool has a fixed table 3 mounted on the machine base 10, and a work piece 2 mounted on the table 3. An end effector which in the specific case is a tool 1 is mounted to the quill 15 by means of a tool holder 4.

Figure 2A:
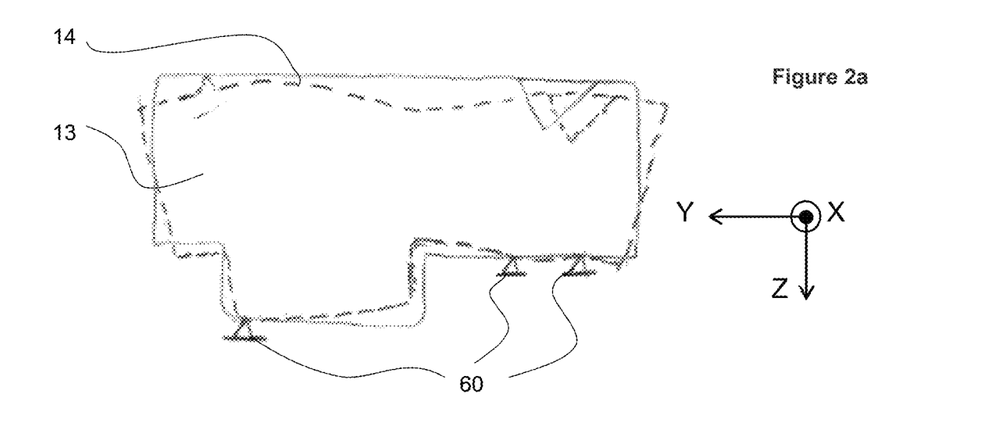
FIG. 2a A view showing measurement of the geometrical deviations of the mounting surface of the traverse.
Figure 2B:
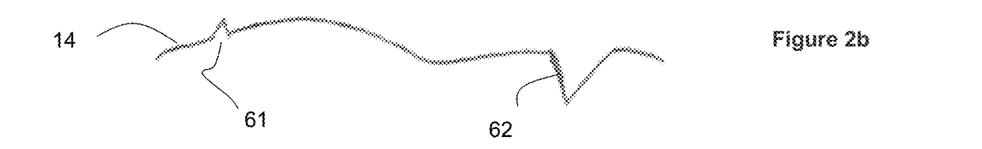
FIG. 2b A view showing measurement of the geometrical deviations of the mounting surface of the traverse.

The machine frame components, column 11, a cross-slide 12, a traverse 13 and a quill 15 have mounting surfaces for the guideway rails and carriages. These mounting surfaces of individual machine frame components are routinely machined by milling and grinding to get straight mounting surfaces 14, and are then measured to check conformity to tolerances in a well-defined measuring configuration. The FIGS. 2a to 2d show the individual steps to identify the adjusted geometrical deviation of the mounting surface 14 of traverse 13. In particular, FIG. 2a shows the measuring configuration of a traverse 13 whose mounting surfaces 14 have been machined in view of the mounting of the guideway rails. For better accessibility the traverse 13 is placed upside-down on three support points 60. The solid line represents the ideal, not deformed frame component, whereas the dashed line is an exaggerated representation of the deformation, with the corresponding straightness deviation at the mounting surface. FIG. 2b shows the raw measurement of the geometrical deviation, at mounting surfaces 14, e.g. the vertical straightness. The orientation of the frame component with respect to gravity and the fixtures define the measuring configuration. The straightness along the mounting surface is measured using for instance using a CMM or an equipment with a dial indicator. The vertical straightness measurement at the mounting surface 14 provides the deviations orthogonal with respect to a straight edge. The exemplary mounting surface has a measured straightness deviation with a protruding area 61 and a depressed area 62.

Figure 2C:
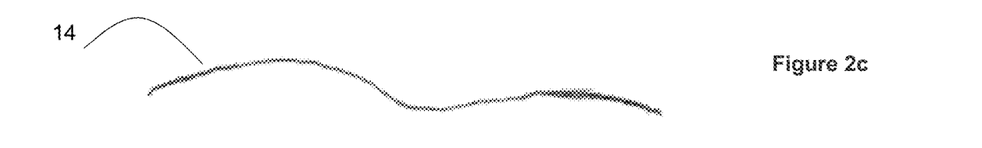
FIG. 2c A view showing measurement of the geometrical deviations of the mounting surface of the traverse.
Figure 2D:
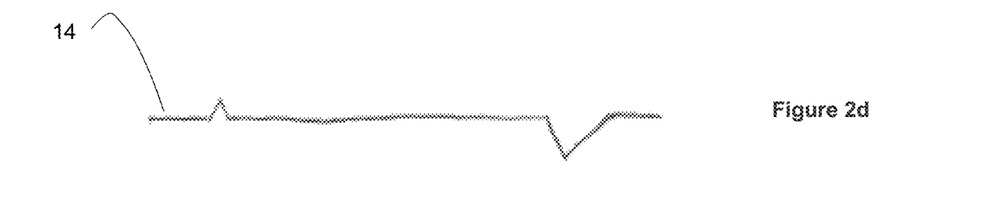
FIG. 2d A view showing measurement of the geometrical deviations of the mounting surface of the traverse.

A portion of the straightness deviation determined in the given measuring configuration is due to the sagging of the traverse under its own weight (gravity). This portion which is qualitatively depicted at FIG. 2c is computed in consideration of the stiffness of the traverse (which is determined by its design), and in consideration of the particular measuring configuration, using the machine model, for instance a Finite Elements Model (FEM) of the traverse and the support points. The computed sagging considers the upside-down orientation of the machine frame component and the position and stiffness of support points and/or fixation points. In summary, the straightness of the mounting surface of the individual machine frame component is measured in a measuring configuration and then the measurement is adjusted by the computed deformation experienced by the individual machine frame component in the measuring configuration. FIG. 2d shows the adjusted straightness deviation at the mounting surface, that is, the raw measurement of the geometrical deviation according to FIG. 2b minus the computed sagging according to FIG. 2c. It is reminded that the representations at FIGS. 2a to 2d are depicted in a measurement configuration, thus reversed with respect to the situation of the assembled positioning machine.

Figure 3A:
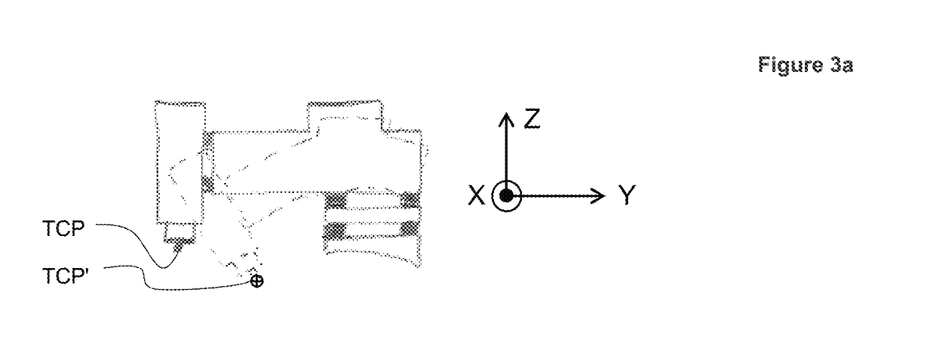
FIG. 3a A view showing the deflection of a machine frame component at different axis positions.
Figure 3B:
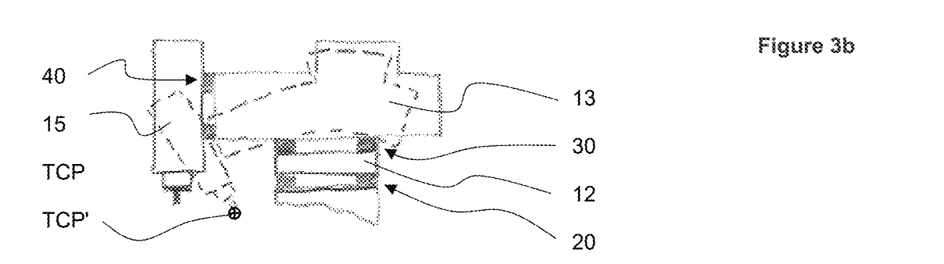
FIG. 3b A view showing the deflection of a machine frame component at different axis positions.
Figure 3C:
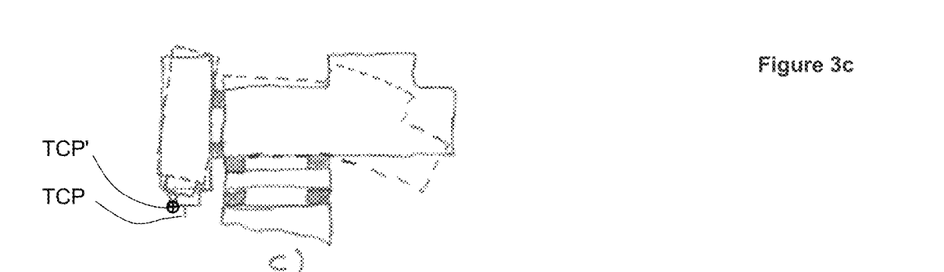
FIG. 3c A view showing the deflection of a machine frame component at different axis positions.

The structural frame 99 is an open frame with a fixed table; the main inherent weakness of this structure is the deflection of the traverse 13 during the Y-axis motion. FIGS. 3a, b and c are qualitative representations of the deflection of traverse and adjacent components at different axis positions. The solid line represents the ideal shape and position of the machine frame components with the TCP represented at the expected position, whereas the dashed line is an exaggerated representation of the components deformation with a shifted TCP'. The deformation of the structural loop is knowingly due in particular to the limited stiffness of the carriages of the X- and Y-axis guideways which are compressed differently depending on the axial position of the traverse, and further to the limited rigidity of the traverse who's deformation also depends on the position of the carriages of the guideways, thus on the axial position of the traverse. As contributors on the deformations there is mainly the weight of the Y-slide itself (traverse 13), and the weight of the components borne by the Y-slide, in particular the weight of the Z-axis (quill 15). Deformation of the stationary base 10 and column 11 is minor. As shown in FIGS. 3a, b, c the machine components deformation is reflected in a deflection or positional error of the TCP, which is mainly a deviation in Z-direction. Further machine components deflection produces a deviation in perpendicularity of the Z-axis with respect to the X/Y-plane.

Figure 4:
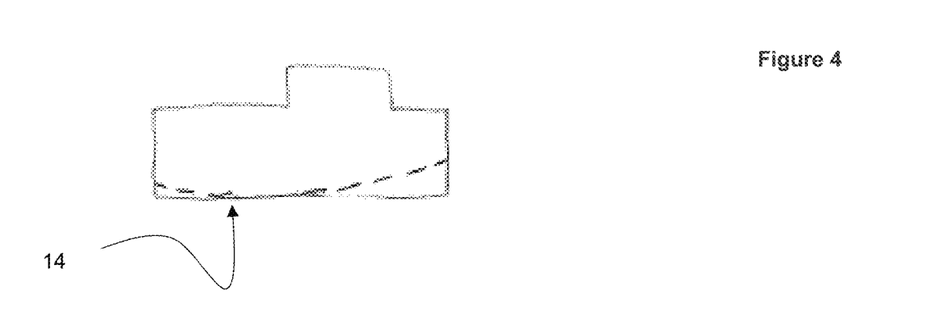
FIG. 4 A view showing the correction profile at a mounting surface.

In order to take the position dependent deformation of the Y-axis traverse 13 into account, the displacements at the TCP are calculated along the axis stroke. FIG. 4 is a qualitative illustration of a computed correction profile to correct the deformation observed at the Y-guideways mounting surface of traverse 13 during the Y-axis motion. The calculation of the position dependent deformations due to gravity, i.e. weight of components, and stiffness of components of the structural loop is made using the machine model, in particular a Finite Elements Model (FEM). Preferably all structural components of the machine assembly are included with their characteristics. To approximate a condition in use a typical tool weight, for instance ¼ of the maximal tool weight may be added to the weight at the TCP for the computation of the deformation. A boundary condition set for the FEM-model is that in an fully assembled condition the TCP executes a horizontal movement.

As can be seen the model of the individual machine frame component and the machine model of the entire frame with all machine frame components and axis guide components are used to predict the deformations which will occur to the individual machine components during their measurement and to predict the deformation of their assembly during use. This knowledge serves as a base for the standard part production and the derivation of the input for the mechanical correction. The component model and the machine model includes the geometry and the deformation properties of the structural machine component(s).

Figure 7:
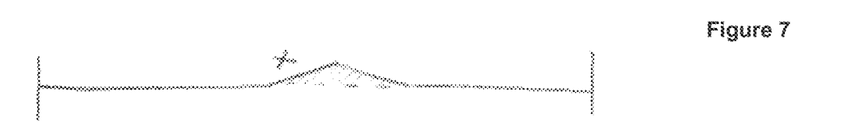
FIG. 7 A view showing the required material removal at the mounting surface to compensate for a measured skimming foil thickness deviation.

The axis guide components have a straightness deviation, typically a vertical and a lateral straightness deviation which is measurable using suitable measuring equipment. The guideway rails have a straightness error which can be observed for instance by mounting the rail on a reference surface and measuring the height variation at the carriage while moving the carriage along the rail, or by mounting the carriage on a fixed base and moving the rail and measuring the height variation at the rail, or by measuring the vertical straightness of the individual ball track along the rail. The position dependent height deviations are measured using a dial gage, or alternatively derived from the inspection protocol provided by the supplier. The deviations are due primarily to the geometric errors of the rails and are in the range of 5-50 µm, depending on the accuracy class. In summary height variations in function of the position along the rail can be identified and included to determine the mounting surface correction profile. FIG. 7 is an exemplary qualitative illustration of the height deviation of the rail measured along the mounting surface, with a region of the mounting surface having an increased thickness.

It is to be noted that the guideways are typically used as a parallel pair (to ensure the necessary stiffness), and that the resulting straightness of the axis motion is better than the straightness of the individual guideway rail due to averaging geometric and elastic effects. Thus the flatness of the contact surfaces at the Y-slider are preferably measured as combination of the straightness of the two rails.

Figure 1:
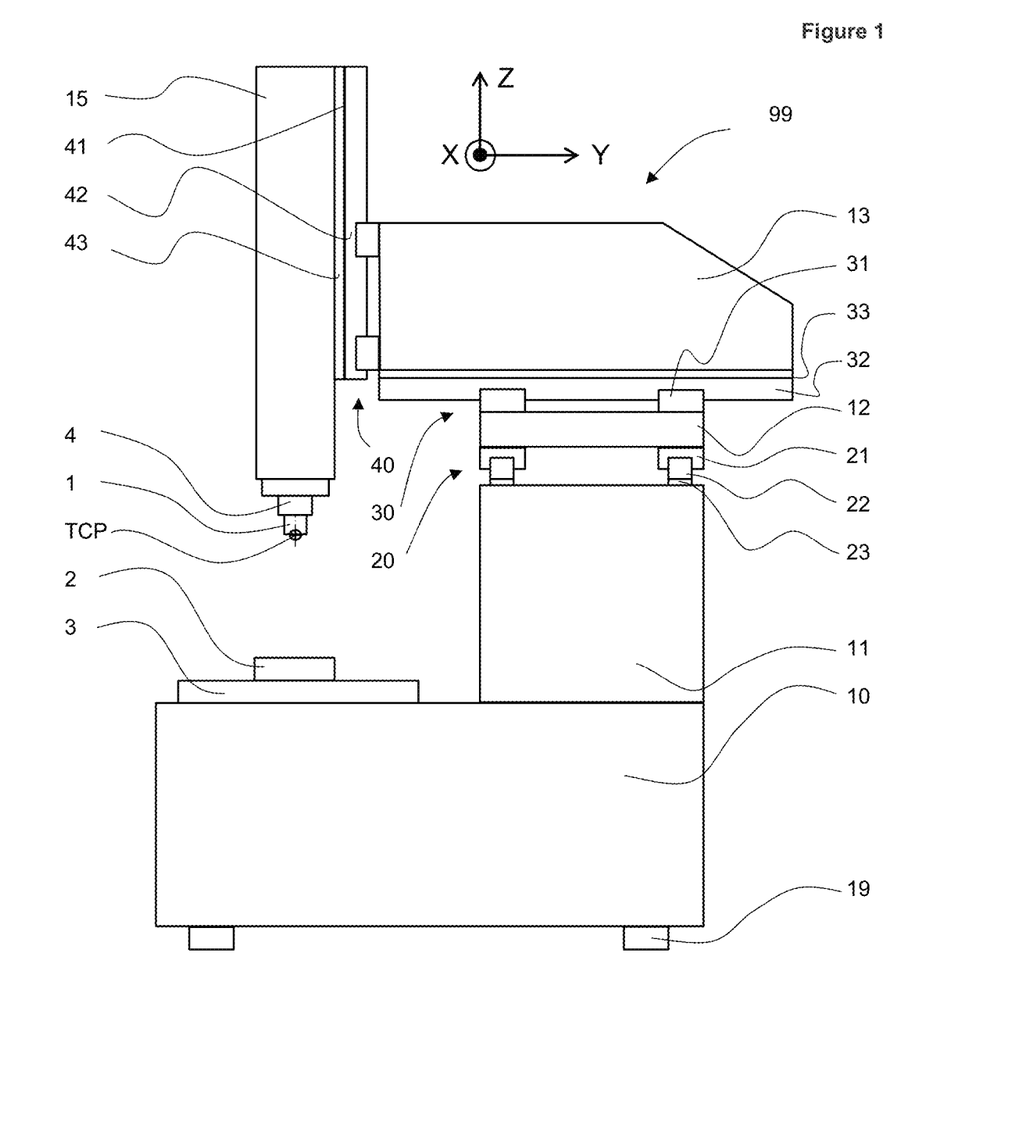
FIG. 1 A 3-axis machine tool.

An intermediate component, such as a shimming foil 23, 33, 43 may be inserted between a mounting surface of the machine frame component and the rails of the guideways, as shown in FIG. 1. The shim is an optional component which may be used to ease the mechanical correction of geometric motion errors of a positioning machine. The shim has two sides; according to the present invention, each of the two surfaces is a "mounting surface" and thus the mounting surface correction profile may be imparted to one of the sides of the shim. The shim is supposed to have very low thickness variations, in the range of 5 µm. Here also thickness variations in function of the position may be revealed by measurement, and may also be included as an error component to determine the mounting surface correction profile.

All deviations are collected in function of the position along the mounting surface. The points of origin for the individual position related deviations along each respective mounting surface are set such that in the assembled state they coincide, such as to allow the summation of the deviations and correction of the cumulated deviations by means of the mounting surface correction profile.

Figure 5:
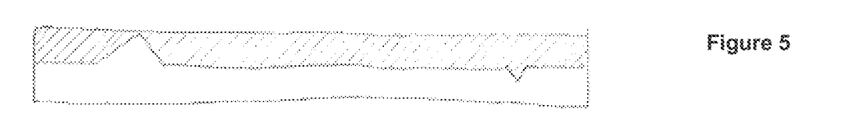
FIG. 5 A view showing the required material removal at the mounting surface to compensate for the geometric deficiencies.
Figure 6:
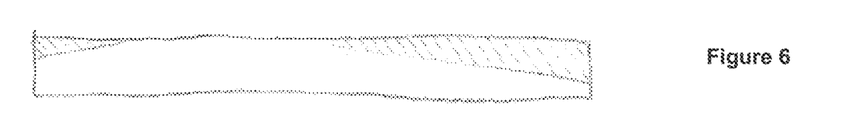
FIG. 6 A view showing the required material removal at the mounting surface to compensate the computed deflection of a machine frame component.

FIG. 5 is a qualitative illustration of the adjusted straightness deviation at the mounting surface of a traverse 13, i.e. the inverted representation of FIG. 2d, which was oriented upside down during the measurement. FIG. 6 is the qualitative illustration of the computed correction profile at the mounting surface of a traverse 13, i.e. the inverted representation of FIG. 4. FIG. 7 is the qualitative illustration of the height variations of the rail of the linear guide.

Figure 8:
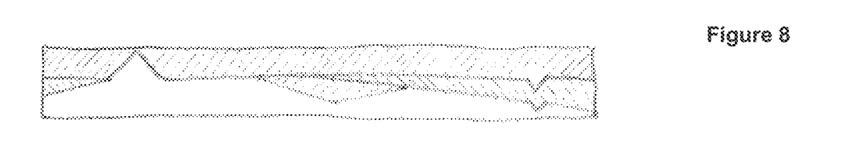
FIG. 8 A view showing the representation of the required material removal at the mounting surface to compensate for the cumulated static error.

FIGS. 5 to 7 are qualitative illustrations representing the amount of material which has to be removed at the mounting surface to compensate for the individual deviations. In particular, the hatched area in FIG. 5 represents the amounts of material to be removed at the mounting surface to compensate for the geometric deficiencies, precisely the adjusted geometric error of FIG. 2d. The correction profile of FIG. 5 is rotated by 180° because, as shown in FIG. 2a, the measuring configuration for the mounting surface 14 at traverse 13 was upside-down. Further, the hatched area in FIG. 6 represents the amounts of material to be removed at the mounting surface to compensate the computed deflection of a machine frame component during the axis motion, while the hatched area in FIG. 7 represents the amounts of material to be removed at the mounting surface to compensate for a measured skimming foil thickness deviation. Lastly, FIG. 8 is a qualitative illustration representing the amount of material which has to be removed at the mounting surface to compensate the summarized deviations, that is the mounting surface correction profile.

Figure 10:
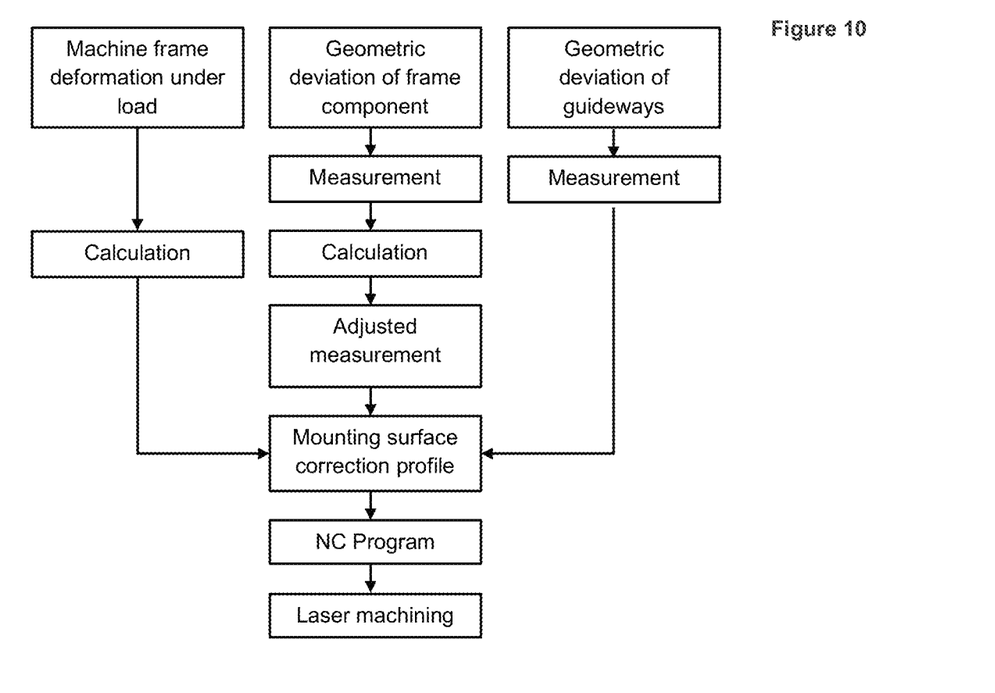
FIG. 10 A chart illustrating the deviation contributors and mounting surface correction profile.

FIG. 10 summarizes the method for the determination of the deviation components mounting surface correction profile and creation of NC-program for the removal of the necessary correction amounts by laser processing.

Summarizing, the mounting surface correction profile to be imparted to the mounting surface of one of the axis guide components is derived by adding the obtained individual deviations, considering the correct sign of each deviation. This means adding the inverted value of the measured deviation of the machine frame component mounting surface, the computed correction profile for the compensation of deformation due to axis movement, the inverted value of the height variation of the rail guides and the inverted value of the thickness variations of the optional shim along the mounting surface, as shown in FIG. 8.

The identified mounting surface correction profile is translated into a machining program for the mechanical correction of the mounting surface, e.g. by laser machining. The mechanical correction is applied with one of the mounting surfaces, for instance at the bottom surface of the guideway rails. Correction is automatically applied by use of a laser processing equipment, including e.g. ultra-short pulse laser which allows very small material removal increments in the useful range of 0.5 μm depth or smaller, with very good repeatability and accuracy. By using a laser source instead of a mechanical scraping to selectively remove the material from the mounting surface, the correction process becomes more accurate, faster and generally more efficient, with no wearing components and low risk of producing scrap. In this way the mechanical correction of the mounting surfaces becomes applicable for the series production of precision mechanisms.

The laser machining process is preferred over other machining methods in particular because it allows a precise selective removal of material as requested by the inventive method, where certain amounts of material are to be removed in function of the position along the mounting surface. The amounts of material to be removed are comparably small, typically less than 30 μm depth, so that the comparably low removal rate is uncritical. Further it is a non-contact process with no need for machining fluids, and the periphery of the mounting surface treated by laser machining remains unaffected.

Nonetheless the mechanical correction may be imparted to a mounting surface using alternative machining processes. The machining process may be one of a mechanical machining process or chemical machining process or thermal machining process or additive manufacturing process. For instance the CNC controlled shot peening or spray jet machining are alternatives to the aforementioned laser machining.

Since the relevant mounting surfaces of the machine frame component and the axis guide components are adjacent and stapled, the mounting surface correction profile is preferably imparted to only one of the components. The mounting surface correction profile is most preferably imparted to the bottom surface of the guideway rail, because the size of the rail is much smaller that the size of a machine frame component. In this way the equipment for the laser machining of the correction amounts can be made much more compact, and the handling of these components is much simpler. Similarly the mounting surface correction profile can be imparted to an intermediate component, such as a shimming foil or a shimming block. These components present the same advantages of the rail and are even more easy to be manipulated. However it is also possible to impart the mounting surface correction profile to the mounting surface at the machine frame component.

Preferably at least one side of the mounting surface of the axis guide component is marked by means of the laser system, for instance with a symbol or text. In this way in the risk of inadvertently inverting the mounting direction of the axis guide component in the successive assembly is prevented.

Lastly the positioning mechanism is assembled, including the axis guide component or machine frame component whose mounting surface has been corrected. Then the assembled positioning mechanism is inspected by executing measurements at the TCP, which are made to certify that the positioning mechanism fulfills the expected motion accuracy. Only in exceptional cases an additional loop shall be required with this procedure.

Figure 11:
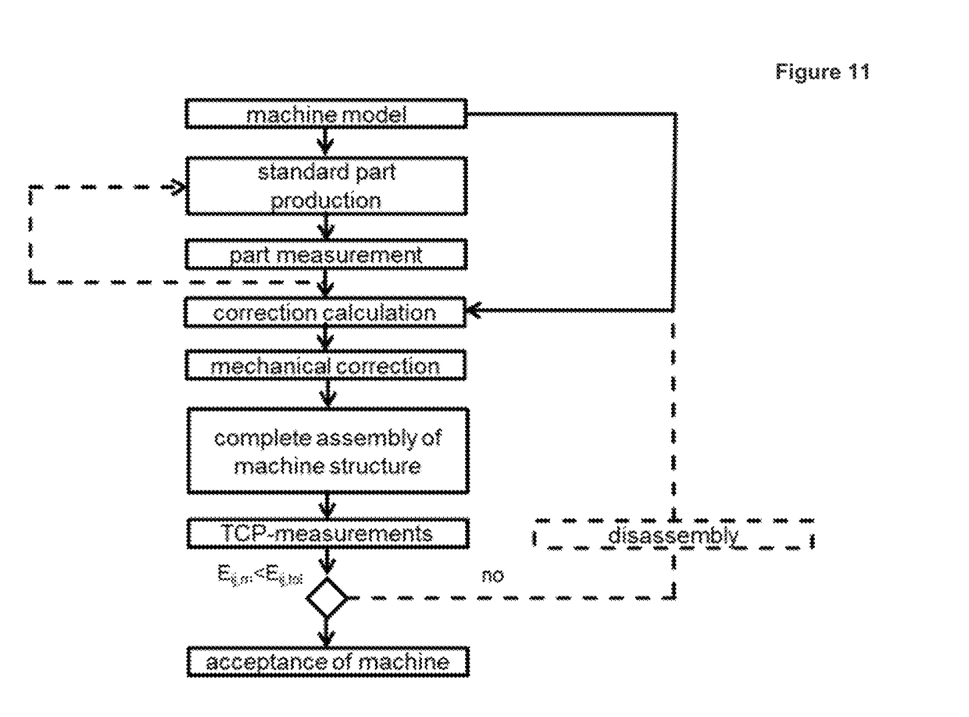
FIG. 11 A chart illustrating the implementation of the method.

The implementation of the inventive method in the production of the positioning machine is now illustrated with reference to FIG. 11. A machine model representing the geometry and the deformation properties of the structural machine components is created. The 'machine model' is used to derive deformation of individual machine frame components as well as deviations at TCP due to the deformation of the structural frame with the axis movement, and to determine required compensation at the mounting surface. The individual frame components are machined in a 'standard part production', and are measured in a 'part measurement' which is executed in a specific measuring configuration. The measurement provides the deviations of the actual geometry with respect to the target geometry of the mounting surfaces. 'Correction calculation' comprises a calculation of the sagging in a measuring configuration to derive an adjusted measurement of the machine frame component, and the correction of the deformation due to axis movement, forming the mounting surface correction profile which serve as input for the mechanical correction of the mounting surface. 'Mechanical correction' is imparted at the mounting surface of axis guide component by laser machining, according to the mounting surface correction profile. Then the positioning machine is assembled in a step of 'complete assembly of machine structure', and 'TCP-measurements' are executed to determine the axis motion accuracy at the TCP with the implemented mounting surface correction profile.

The use of the inventive method in the manufacturing of the positioning machine leads to a consistent improvement of the products base motion accuracy, in particular reduced straightness deviations and reduced rotation motion errors. Preferably the production process is monitored by statistical process control (SPC). The measurements of all positioning mechanism are collected and analyzed to identify systematic deviations, which may then be corrected, for further improvement of the mounting surface correction profile and thus the motion accuracy the positioning mechanism.

In addition to the mechanical correction method disclosed in the present invention, other correction methods such as numerical compensation can be added in known manner. The geometrical deviations of a machine are determined by measurement at the assembled machine, and the measured deviations are then used for numerical compensation, to further improve the machine accuracy.

Figure 9B:
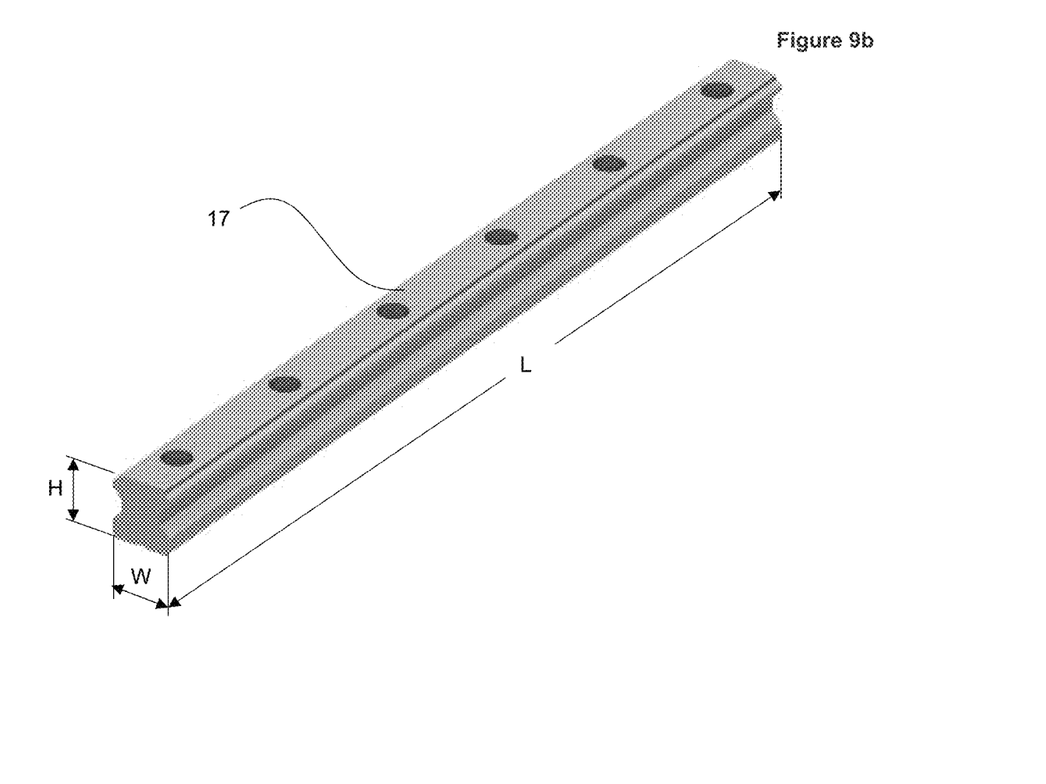
FIG. 9b A view showing the rolling element linear guideway.

The imparting of the mounting surface correction profile by removal of material along the mounting surface of the axis guide component may be done using an universal laser processing machine, typically a laser texturing machine. This way of imparting the mounting surface correction profile is suitable for the correction of the mounting surface of machine frame components, which are typically very large, and which have typically two distant parallel mounting surfaces. However the object to be processed, e.g. the bottom surface of a guideway rail is characterized in that a small amount of material is to be removed along the main extension direction of the mounting surface, whereas commercial laser texturing machines are typically designed to accommodate 2D, 2.5D or 3D objects. In this case the machining volume of such commercial laser texturing machines is unnecessary large. The main extension direction of the mounting surface of the axis guide component corresponds with the axis direction. For instance the bottom surface of a rail or the surface of a skimming foil has typically a main extension direction, as shown in FIG. 9b. Thus a device for the mechanical correction of a mounting surface of the axis guide component is preferably adapted for the particular purpose.

Figure 12:
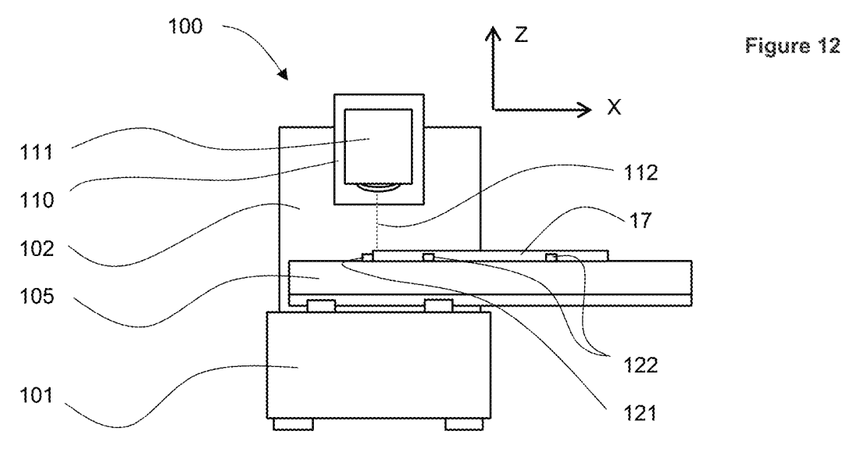
FIG. 12 A view showing the dedicated equipment for the mechanical correction by laser machining.

FIG. 12 shows an embodiment shows a dedicated device 100 for the mechanical correction of geometric motion errors of a mounting surface of the axis guide component of a positioning machine. This device 100 comprises a mounting table 105 for the mounting of the guideway rail 17 or a shimming foil, one or more reference pins 121, 122 or stoppers for the precise alignment of the axis guide component on the mounting table and/or holding means and/or clamping means (not shown) to fix the axis guide component against the mounting table, a laser unit 111 including a laser source and a mirror galvanometer (both not shown), the laser unit producing a laser beam 112 who's axis is essentially orthogonal with respect to the mounting table 105, the mounting table and the laser unit 111 being movable with respect to each other in the direction of the axis guide component axis, and a control unit (not shown) to control the laser beam of the laser unit and the relative position of the mounting table with respect to the laser unit, such as to impart the mounting surface correction profile to the axis guide component.

The table 105 of the dedicated correction device 100 is mounted on a stationary base and is movable along a horizontal X-axis. The stroke of this horizontal axis of the dedicated correction device covers the entire surface of the axis guide component to be processed. The dedicated correction device has a column 102 which is mounted to the stationary base, and a vertical Z-axis 110 mounted on said column 102. The Z-axis bears a laser unit 111 and optionally a measuring unit (not shown), for instance including optical means or touch probe. The device 100 is simple, since it has essentially two linear axes, the Z-axis having a very short stroke in the range of 5 to 50 mm, and an X-axis having a long stroke to accommodate all coming guideway rails or shimming foils.

The following is an exemplary explanation of the process of imparting of the mounting surface correction profile by means of a dedicated correction device 100: The rail of a linear guide having a length L=1050 mm, width W=34 mm and thickness H=30 mm is precisely mounted on the mounting table 105 of the correction device 100, upside down, means with its mounting surface on top. The rail abuts on top at a first reference pin 121 on said mounting table 105 to determine the origin of the rail 17, and laterally against two additional reference pins 122 to determine the lateral position of the rail 17, and to align the rail with the X-movement of the table 105. The vertical position of the laser unit 111 is adjusted by positioning the Z-axis 110, according to the height of the rail 17. The correction program is started, whereby table 105 is positioned at the origin of the rail, and then the amount of material according to the mounting surface correction profile is automatically removed from the rail. The galvanometer scanner provides the necessary degrees of freedom to stepwise and layer wise process a defined area of mounting surface, and covering the entire width of the mounting surface, with no additional transversal axis movements.

Figure 13:
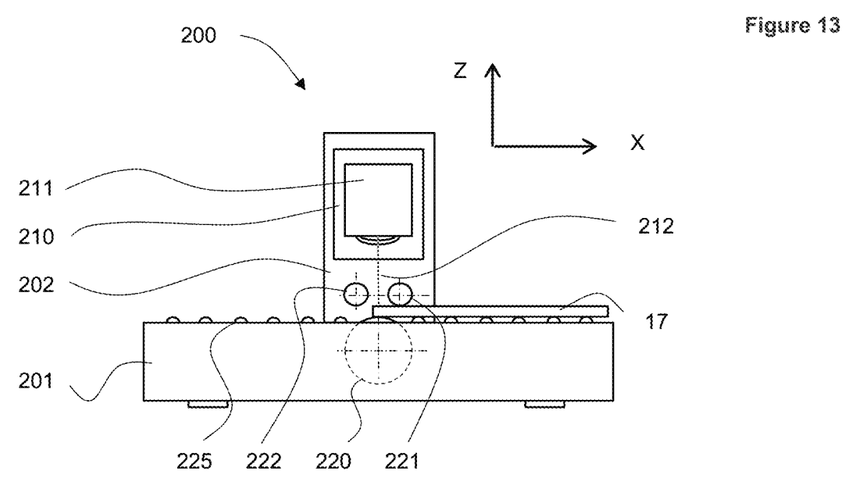
FIG. 13 A view showing the dedicated equipment for the mechanical correction by laser machining.

In another embodiment shown in FIG. 13, a device 200 for the mechanical correction of geometric motion errors of a mounting surface of the axis guide component of a positioning machine comprises a base 201 with a number of support rolls 225 to support and guide the guideway rail 17, a carrier roll 220 to precisely support the rail in the area to be processed, two frictional feeder rolls 221 and 222 for the controlled feeding of the rail. The carrier roll may comprise an encoder to provide a rail position feedback. The dedicated correction device has a column 202 which is mounted to the stationary base, and a vertical Z-axis 210 mounted on said column 202. The Z-axis bears a laser unit 211 and a optionally a measuring unit (not shown). The vertical position of the laser unit 211 is adjusted by positioning the Z-axis 210, according to the height of the rail 17. The correction program is started, whereby the frictional feeder rolls 221 and 222 advance the rail and control its position while the laser beam 212 removes the amount of material according to the mounting surface correction profile.

The device 100,200 for the mechanical correction of a mounting surface of the axis guide component illustrated here above may have essentially only one controlled feeding axis for the relative positioning of the mounting surface and the laser unit, thus it has the advantage that is compact, more accurate, and lower priced than an universal machine.

A device 100,200 for the mechanical correction of a mounting surface of the axis guide component of a positioning machine may further comprise automation means, including loading and unloading, measurement of dimension and position of the axis guide component, measurement of initial and final of the mounting surface of the axis guide component, etc.

The invention has been described illustrating the case of a typical geometric motion error, that is the vertical straightness deviation at a traverse. The method for the mechanical correction according the invention can also be used to correct other geometric motion error, in particular the lateral straightness deviation. Here a lateral mounting surface correction profile is determined again by determining the individual deviation contribution and summarizing these contributions. The lateral mounting surface correction profile may be imparted at the side surface of the guideway rail or at the corresponding mounting surface of the machine frame component or at a shim.

Machine frame components have typically two distant parallel mounting surfaces for each axis on which the guideway rails are mounted. Thus, alternatively to an individual straightness measurement at the mounting surfaces of the frame component described with reference to FIGS. 2a to 2d, and individual compensation, the straightness at the mounting surfaces of the machine frame component can be measured individually and combined to determine a flatness at the frame component mounting surfaces, and to determine matching mounting surface correction profiles for the two distant parallel mounting surfaces in consideration of the determined flatness.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The invention claimed is:

1. A method for the mechanical correction of geometric motion errors of a positioning machine having at least two machine frame components and at least one axis movement assembly for the relative movement of the machine frame components, the at least one axis movement assembly having a plurality of axis guide components, each axis guide component and each machine frame component having a mounting surface, comprising:
   determining a mounting surface correction profile for the considered axis, the mounting surface correction profile describing the correction amounts in function of the position for the mechanical correction of the considered axis, and that
   imparting the determined mounting surface correction profile to the mounting surface of the axis guide component or to the mounting surface of the machine frame component of the considered axis by machining.

2. A method for the mechanical correction of geometric motion errors of a positioning machine according to claim 1, wherein the mounting surface correction profile is derived from
   a. a measured geometric error of the mounting surface of the individual machine frame component, the geometric error being a straightness error determined in function of the position along the mounting surface of the considered axis, and/or
   b. a computed deviation of a Tool Center Point of the positioning machine, determined by the relative displacement of the machine frame components along the considered axis.

3. A method for the mechanical correction of geometric motion errors of a positioning machine according to claim 2, wherein
   a. the geometric error of the mounting surface of the individual machine frame component is first determined by measurement of the straightness or flatness of the mounting surface of the individual machine frame component, in a measuring configuration, and
   b. a static deformation of the individual machine frame component at the mounting surface is computed for said measuring configuration, and
   c. an adjusted geometric error of the mounting surface of the individual machine frame component is computed by subtracting the computed deformation occurring in the measuring configuration from the firstly measured geometric error.

4. A method for the mechanical correction of geometric motion errors of a positioning machine according to claim 3, wherein the computed static deformation of the individual machine frame component occurring in the measuring configuration is determined in consideration of the orientation of the machine frame component with respect to gravity and in consideration of the position and stiffness of support points.

5. A method for the mechanical correction of geometric motion errors of a positioning machine according to claim 2, wherein the computed deviation of a Tool Center Point (TCP) of the positioning machine is transposed at the mounting surface of the machine frame component such that the computed deviation of a Tool Center Point is cancelled.

6. A method for the mechanical correction of geometric motion errors of a positioning machine according to claim 2, wherein the mounting surface correction profile is further derived in consideration of a geometric error of one or more axis guide components of the considered axis, said axis guide component being one or more of
   a. the axis guideway(s) of the considered axis, including rail(s) and/or carriage(s); and
   b. an intermediate component, in particular a shimming foil or a shimming block.

7. A method for the mechanical correction of geometric motion errors of a positioning machine according to claim 1, wherein the mounting surface correction profile is computed as the sum of
   a. an inverted adjusted geometric error along the mounting surface of the machine frame component of the considered axis, and
   b. an inverted geometric error of one or more axis guide components along the mounting surface of the considered axis, and
   c. a computed deviation of a Tool Center Point of the positioning machine determined by the relative displacement of the machine frame components along the considered axis, transposed at the mounting surface of the machine frame component.

8. A method for the mechanical correction of geometric motion errors of a positioning machine according to claim 1, wherein the mechanical correction of the considered axis is imparted by removing the material amounts according to the determined mounting surface correction profile at one of
   a. the mounting surface of the machine frame component of the considered axis,
   b. the mounting surface of the rail(s) of the guideway(s) of the considered axis,
   c. the mounting surface of an intermediate component, in particular a shimming foil or a shimming block.

9. A method for the mechanical correction of geometric motion errors of a positioning machine according to claim 1, wherein the determined mounting surface correction profile is imparted to the mounting surface of the axis guide component by one of a mechanical machining, chemical machining, thermal machining or additive manufacturing.

10. A method for the mechanical correction of geometric motion errors of a positioning machine according to claim 1, wherein the determined mounting surface correction profile is imparted to the mounting surface of the axis guide component by laser machining.

11. A method for the mechanical correction of geometric motion errors of a positioning machine according to claim 1, wherein the axis movement assembly for the relative movement of the machine frame components is a linear axis movement assembly or a rotary axis movement assembly.

12. A method for the mechanical correction of geometric motion errors of a positioning machine according to claim 1, wherein the positioning machine is a machine tool, a coordinate measuring machine or a manipulator.

13. A device for the mechanical correction of a mounting surface of an axis guide component of a positioning machine configured to perform the method illustrated of claim 1, the device having a controller, comprising:

a. a mounting table for the mounting of the axis guide component, b. one or more reference elements for the precise positioning of the axis guide component on the mounting table and/or holding means and/or clamping means to fix the axis guide component against the mounting table, c. a laser unit producing a laser beam whose axis is essentially orthogonal with respect to the mounting table, the mounting table and the laser unit being movable with respect to each other in the direction of the axis guide component axis, d. the controller being configured to control the laser beam of the laser unit and the relative position of the mounting table with respect to the laser unit, such as to impart the mounting surface correction profile to the mounting surface of the axis guide component.

* * * * *